US010963945B2

(12) United States Patent
Wan

(10) Patent No.: US 10,963,945 B2
(45) Date of Patent: Mar. 30, 2021

(54) METHOD AND SERVER FOR REGISTERING A CUSTOMIZED DEVICE

(71) Applicant: TENCENT TECHNOLOGY (SHENZHEN) COMPANY LIMITED, Guangdong (CN)

(72) Inventor: Chang Xun Wan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 173 days.

(21) Appl. No.: 16/033,360

(22) Filed: Jul. 12, 2018

(65) Prior Publication Data
US 2018/0322563 A1 Nov. 8, 2018

Related U.S. Application Data

(63) Continuation of application No. PCT/CN2017/083022, filed on May 4, 2017.

(30) Foreign Application Priority Data

May 9, 2016 (CN) .......................... 201610304057.X

(51) Int. Cl.
*G06Q 30/00* (2012.01)
*G06Q 30/06* (2012.01)
(Continued)

(52) U.S. Cl.
CPC ..... *G06Q 30/0633* (2013.01); *G06Q 10/0833* (2013.01); *H04L 41/0806* (2013.01); *H04W 12/06* (2013.01)

(58) Field of Classification Search
CPC ..... G06Q 30/0601–0643; G06Q 30/08; G06Q 10/0833
(Continued)

(56) References Cited

U.S. PATENT DOCUMENTS 10,075,422 B2* 9/2018 Rawcliffe ............... H04L 67/10
2014/0095727 A1* 4/2014 Evans .................... H04L 67/303
709/230
(Continued)

FOREIGN PATENT DOCUMENTS

CN 102413112 A 4/2012
CN 103716911 A 4/2014
(Continued)

OTHER PUBLICATIONS

Expanding internet of things network in 100 U.S cities to meet strong market demand; partnerships with strategic site owners will enable rapid deployment for logistics, smart cities agriculture and other top IoT sectors. (May 4, 2016). M2 Presswire Retrieved from https://dialog.proquest.com/professional/docview/1.*
(Continued)

*Primary Examiner* — Resha Desai
(74) *Attorney, Agent, or Firm* — Sughrue Mion, PLLC

(57) ABSTRACT

A method is provided. The method includes receiving a device type identifier, network access data, and a user identifier that correspond to an order identifier from a terminal. An allocated device serial number corresponding to the order identifier is obtained, the device type identifier, the device serial number, the network access data being written into a customized controlled device. The customized controlled device that is identified by the allocated device serial number and the device type identifier is connected to. A device registration request is received from the terminal and, in response to receiving the device registration request, device registration is performed based on the device type identifier, the allocated device serial number, and the user identifier.

12 Claims, 10 Drawing Sheets

(51) Int. Cl.
*H04W 12/06* (2021.01)
*H04L 12/24* (2006.01)
*G06Q 10/08* (2012.01)

(58) Field of Classification Search
USPC .............................................. 705/26.1–27.2
See application file for complete search history.

(56) References Cited

U.S. PATENT DOCUMENTS

| | | | | |
|---|---|---|---|---|
| 2014/0241354 | A1* | 8/2014 | Shuman | H04L 12/281 370/390 |
| 2015/0281229 | A1* | 10/2015 | Kang | H04L 67/146 713/185 |
| 2016/0105292 | A1* | 4/2016 | Choi | H04L 51/02 709/206 |
| 2016/0147919 | A1* | 5/2016 | Yabe | H04L 12/2816 700/275 |
| 2017/0006006 | A1* | 1/2017 | Rawcliffe | H04L 63/08 |

FOREIGN PATENT DOCUMENTS

| | | |
|---|---|---|
| CN | 203910008 U | 10/2014 |
| CN | 104967596 A | 10/2015 |
| CN | 104967994 A | 10/2015 |
| CN | 105208631 A | 12/2015 |
| CN | 105228147 A | 1/2016 |
| CN | 105282234 A | 1/2016 |
| CN | 105392182 A | 3/2016 |
| CN | 105978873 A | 9/2016 |
| JP | 2001-265731 A | 9/2001 |

OTHER PUBLICATIONS

International Search Report of PCT/CN2017/083022 dated Jul. 25, 2017.
Communication dated Apr. 13, 2020, from The State Intellectual Property Office of the P.R. of China in Application No. 201610304057.X.
Communication dated Nov. 13, 2019 from the State Intellectual Property Office of the P.R.C. in counterpart Application No. 201610304057.X.
Written Opinion of the International Searching Authority for PCT/CN2017/083022 dated Jul. 25, 2017.

* cited by examiner

METHOD AND SERVER FOR REGISTERING A CUSTOMIZED DEVICE

CROSS-REFERENCE TO RELATED APPLICATION

This application is a continuation of International Application No. PCT/CN2017/083022, filed on May 4, 2017, which claims priority from Chinese Patent Application No. 201610304057.x, entitled "METHOD FOR REGISTERING CUSTOMIZED DEVICE AND APPARATUS" filed on May 9, 2016, in the Chinese Patent Office, the disclosures of which are incorporated herein by reference in their entireties.

BACKGROUND

1. Field

This application relates to methods for registering a customized device, a server, and a terminal, in the field of Internet technologies.

2. Description of Related Art

The Internet of Things is an important part of the new generation of information technologies, which refers to an internet in which things are connected to each other. A core and a basis of the Internet of Things are still the Internet. The Internet of Things is a network extended and expanded based on the Internet. The Internet of Things enables the Internet based on a terminal to be extended and expanded to information exchange and communication between a terminal and a thing, and between things.

In the related art, device production vendors can build a network access module in devices such as a socket, a camera, an air conditioner, a refrigerator, and a watch, to produce a controlled device that can be connected to a network. After purchasing the controlled device, a user needs to perform a device registration operation, and establish an association between the user and the controlled device to access and control the controlled device.

A controlled device needs to be registered for use, on the premise that the controlled device accesses a network. In the related art, when a controlled device needs to access a network, a user needs to manually fill in the data needed for network access. For example, a user needs to manually enter a service set identifier (SSID) and a password. The related art technology is inconvenient and inefficient to the user to register the controlled device through the network, resulting in low efficiency for registering the controlled device.

SUMMARY

According to an aspect of one or more exemplary embodiments, there is provided a method including receiving a device type identifier, network access data, and a user identifier that correspond to an order identifier from a terminal. An allocated device serial number corresponding to the order identifier is obtained, the device type identifier, the device serial number, the network access data being written into a customized controlled device. The customized controlled device that is identified by the allocated device serial number and the device type identifier is connected to. A device registration request is received from the terminal and, in response to receiving the device registration request, device registration is performed based on the device type identifier, the allocated device serial number, and the user identifier.

According to an aspect of one or more exemplary embodiments, there is provided a method performed by at least one computer processor, the method comprising obtaining an order identifier, and uploading a device type identifier, network access data, a user identifier, and the order identifier correspondingly to a server, the device type identifier, the network access data, and an allocated device serial number corresponding to the order identifier being written into a customized controlled device. A device registration request is sent to the server. A device registration result is received from the server.

According to an aspect of one or more exemplary embodiments, there is provided a server comprising at least one memory configured to store computer program code and at least one processor configured to access the at least one memory and operate according to the computer program code. The computer program code includes code to implement receiving a device type identifier, network access data, and a user identifier that correspond to an order identifier from a terminal. An allocated device serial number corresponding to the order identifier, the device type identifier, the device serial number is obtained, the network access data being written into a customized controlled device. The customized controlled device that is identified by the allocated device serial number and the device type identifier is connected to. A device registration request is received from the terminal and, in response to receiving the device registration request, device registration is performed based on the device type identifier, the allocated device serial number, and the user identifier.

According to an aspect of one or more exemplary embodiments, there is provided a terminal comprising at least one memory configured to store computer program code and at least one processor configured to access the at least one memory and operate according to the computer program code. The computer program code includes code to implement obtaining an order identifier, and uploading a device type identifier, network access data, a user identifier, and the order identifier correspondingly to a server, the device type identifier, the network access data, and an allocated device serial number corresponding to the order identifier being written into a customized controlled device. A device registration request is sent to the server and a device registration result is received from the server.

The details of one or more exemplary embodiments are provided in the accompanying drawings and descriptions below. Other features, objectives, and advantages of this application become more obvious by referencing the specification, accompanying drawings, and claims.

BRIEF DESCRIPTION OF THE DRAWINGS

The accompanying drawings described herein are used for providing further understanding for this application and constitute a part of this application. Example embodiments of this application and descriptions thereof are used for explaining this application and do not constitute an improper limitation to this application. In the drawings.

DETAILED DESCRIPTION OF THE EXEMPLARY EMBODIMENTS

The following describes exemplary embodiments of the present disclosure in detail with reference to the accompanying drawings. It should be understood that, the following described exemplary embodiments are merely used to describe and explain the present disclosure, and are not used to limit the present disclosure. It should note that the exemplary embodiments to be described are some rather than all of the exemplary embodiments of this application. All other embodiments obtained by a person skilled in the art based on the example embodiments of the present application without creative efforts shall fall within the protection scope of the present application.

Figure 1:
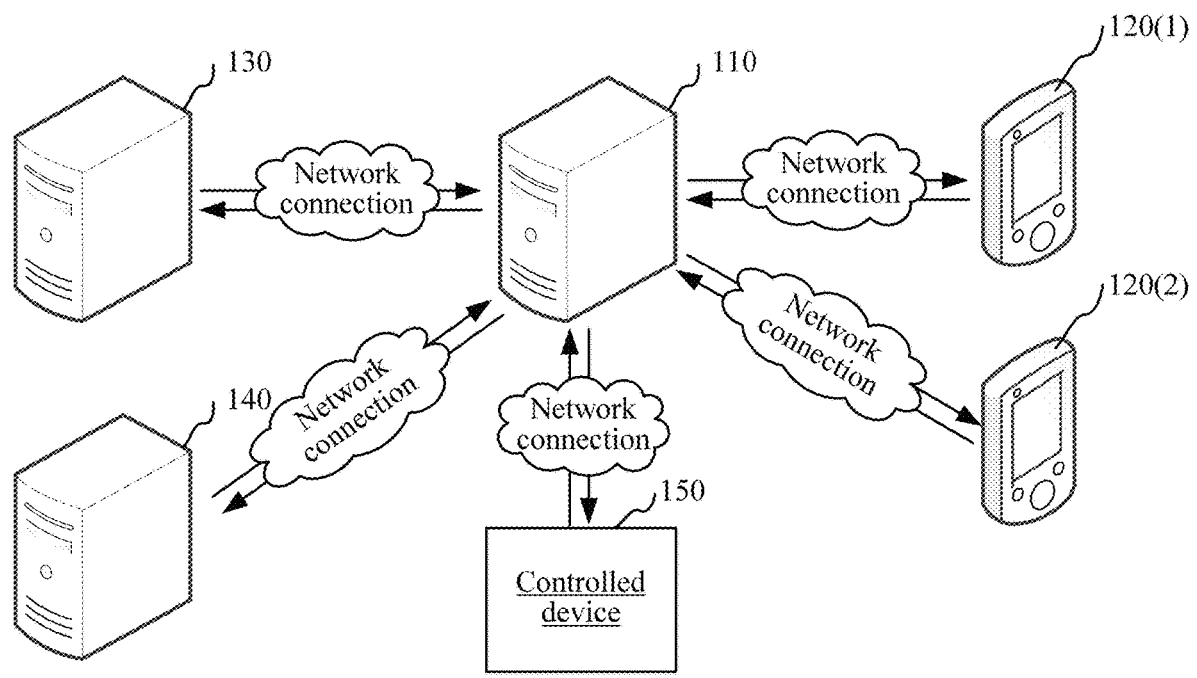
FIG. 1 is a diagram of an application environment of a system for managing a customized device according to an exemplary embodiment.

FIG. 1 is a diagram of a system for managing a customized device according to an exemplary embodiment. The system may include an IoT open platform 110, a terminal 120, a device customization server 130, and a logistics server 140. The system for managing a customized device is configured to provide a customization and access service to a controlled device 150. The IoT open platform 110 includes one or more servers, is configured to provide an access service to the controlled device 150, and interacts with the terminal 120, the device customization server 130, and the logistics server 140. The IoT open platform 110 is configured to process the device registration request. The terminal 120, for example, a terminal 120 (1) and a terminal 120 (2) shown in FIG. 1, is configured to perform device registration on the controlled device 150, access the controlled device 150, and the like by means of the IoT open platform 110. The device customization server 130 is configured to control customization steps such as production and data write of the controlled device 150. The logistics server 140 is configured to process logistics information related to the controlled device 150.

Figure 2:
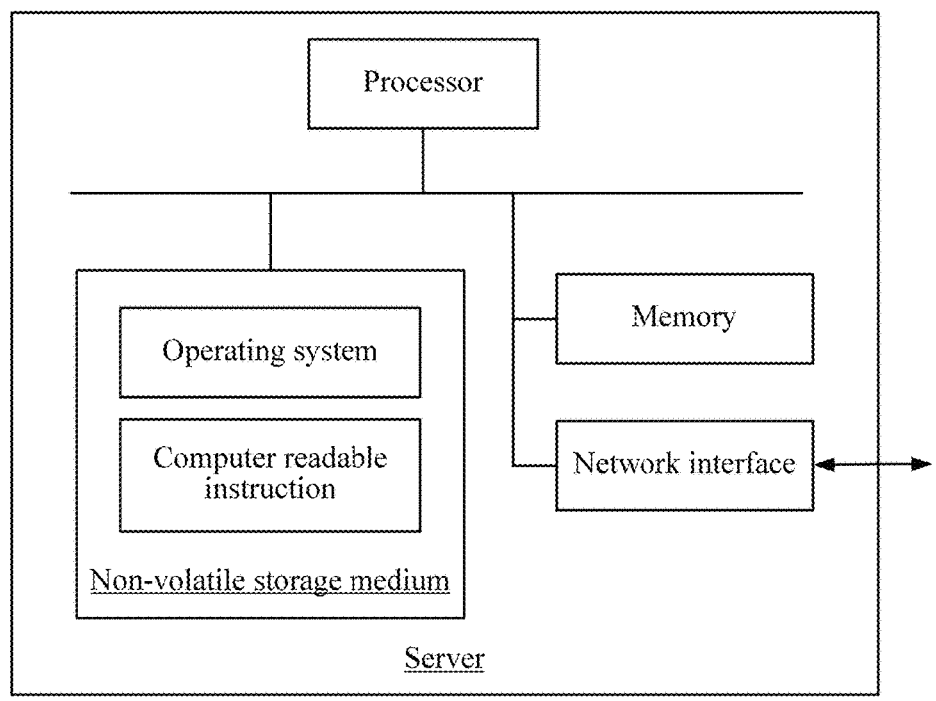
FIG. 2 is a schematic structural diagram of a server used as an Internet of Things (IoT) open platform according to an exemplary embodiment.

FIG. 2 is a schematic structural diagram of a server that can be used as IoT open platform according to an exemplary embodiment. The server may include a processor, a non-transitory computer storage medium, a memory, and a network interface that are connected by using a system bus. The non-transitory computer storage medium stores an operating system and computer readable instructions, and when executed by the processor, the computer readable instructions can cause the processor to perform a method for registering a customized device. The memory stores computer readable instructions, and when executed by the processor, the computer readable instructions can cause the processor to perform a method for registering a customized device. The network interface is configured to connect to a network.

Figure 3:
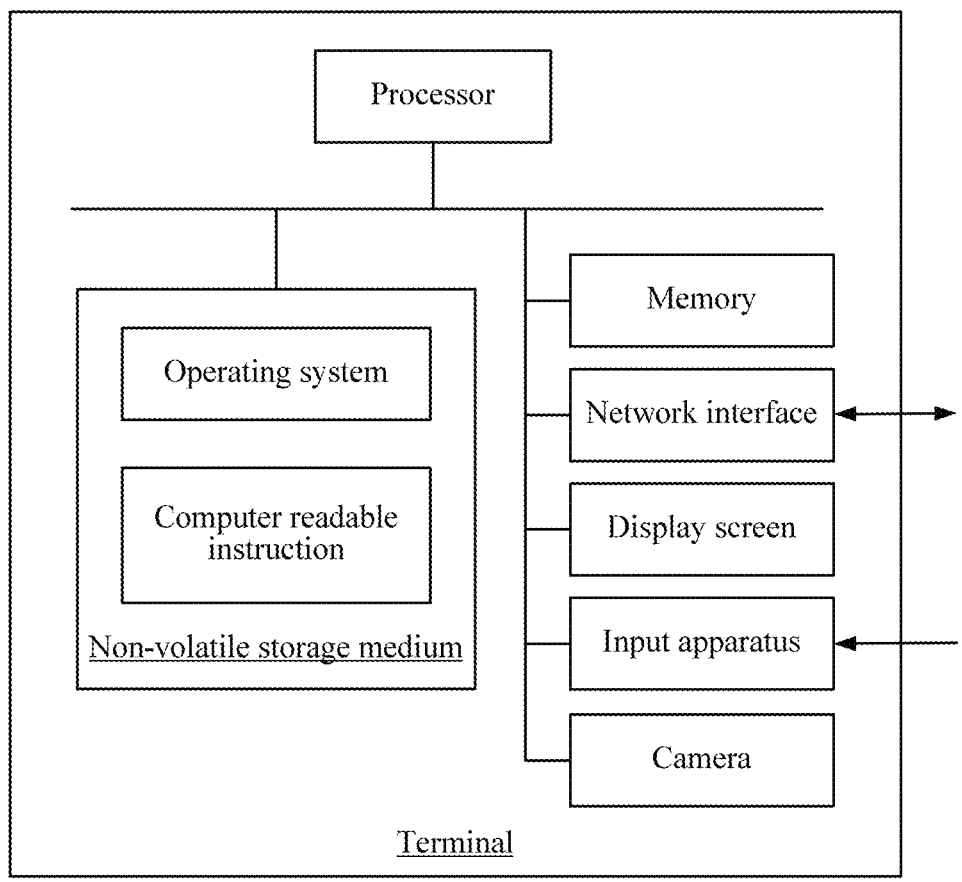
FIG. 3 is a schematic structural diagram of a terminal according to an exemplary embodiment.

FIG. 3 is a schematic structural diagram of a terminal according to an exemplary embodiment. The terminal may include a processor, a non-transitory computer storage medium, a memory, a network interface, a display screen, a camera, and an input apparatus that are connected by using a system bus. The non-transitory computer storage medium stores an operating system and computer readable instructions, and when executed by the processor, the computer readable instructions can cause the processor to perform a method for registering a customized device. The memory stores computer readable instructions, and when executed by the processor, the computer readable instructions can cause the processor to perform a method for registering a customized device. The network interface is configured to connect to a network. The display screen may be a liquid crystal display screen or an electronic ink display screen, or the like. The input apparatus may be a touchpad, a track ball, a mouse, or a touch layer overlapping the display screen, a touchscreen which form by the display screen and the touch layer, or the like. The network interface is configured to connect to a network. The terminal may be a personal computer or a mobile terminal or the like. The mobile terminal includes at least one of a mobile phone, a tablet computer, a personal digital assistant (PDA), an ebook reader that can be connected to a network, and the like.

Figure 4:
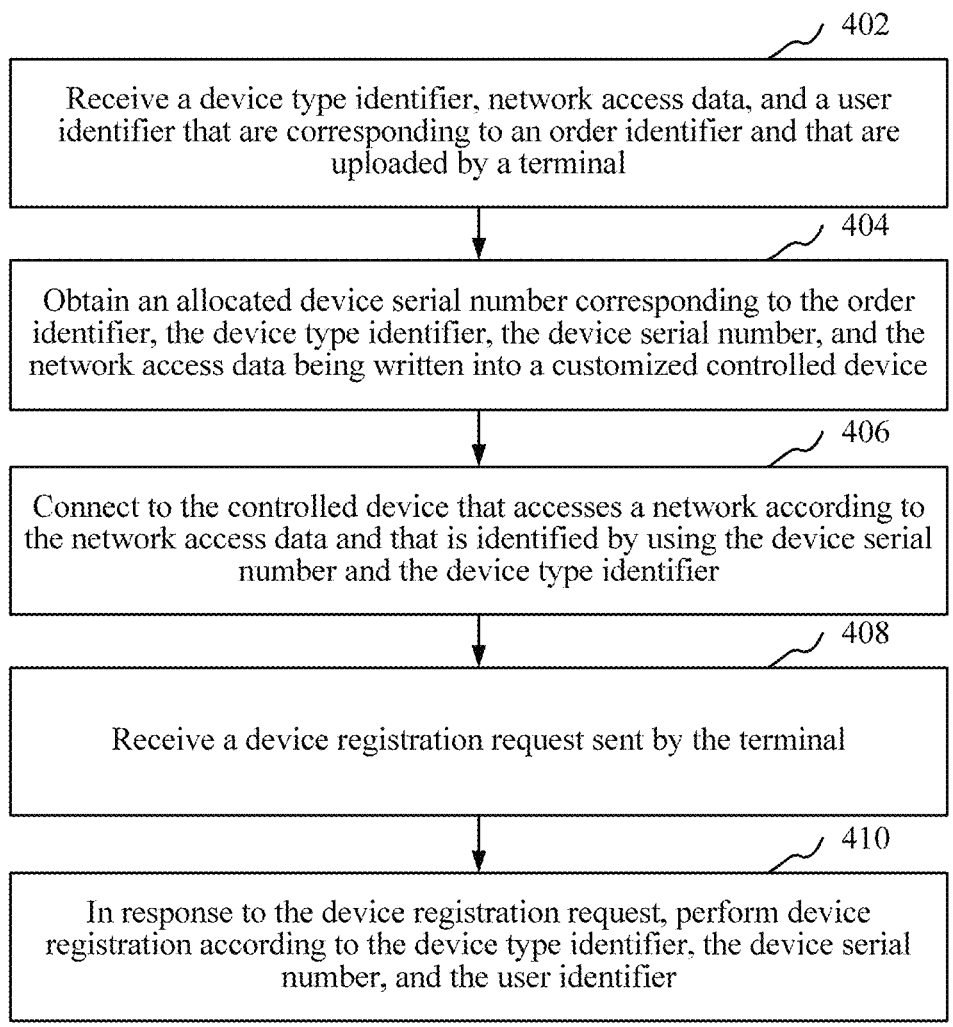
FIG. 4 is a schematic flowchart of a method for registering a customized device according to an exemplary embodiment.

FIG. 4 is a schematic flowchart of a method for registering a customized device according to an exemplary embodiment. In this exemplary embodiment, the descriptions are made by using that the method is applied to the foregoing IoT open platform. For example, the IoT open platform 110 shown in the FIG. 1. The method may include the following steps:

Step 402: Receive a device type identifier, network access data, and a user identifier that are corresponding to an order identifier and that are uploaded by the terminal.

The order identifier is a unique identifier of an order. An order represents a task of customizing a controlled device. The order may include the device type identifier representing a type of the customized controlled device, the network access data, a user identifier of an actual user representing the controlled device, or the like. The network access data is data needed for accessing a network, for example, a BSSID and a corresponding password of a router in the user's house, or a network dial account and a corresponding password. There may be multiple pieces of network access data. The user identifier is a unique string for identifying the user. The user may customize appearance, package, embedded-in software content, the like of the controlled device, and other than the network access data of the controlled device. Customized content is corresponding to the order identifier.

In an exemplary embodiment, the IoT open platform may receive an order creation request triggered by the terminal, generate an order identifier based on the order creation request and return the order identifier to the terminal, and then receive device type identifier, network access data, and a user identifier that are corresponding to the order identifier and that are uploaded by the terminal.

In an exemplary embodiment, the IoT open platform may receive an order creation request triggered by a first terminal, and generate an order identifier according to the order creation request and return the order identifier to the first terminal, so that the first terminal transfers the order identifier and a selected device type identifier to a second terminal. Then, the IoT open platform receives the device type identifier, network access data, and a user identifier that are corresponding to the order identifier and that are uploaded by the second terminal. The user identifier in this exemplary embodiment is a user identifier of the second terminal.

Specifically, the first terminal may transfer a link that is generated based on the order identifier and the selected device type identifier to the second terminal; or the first terminal may display a graphic code, the graphic code being formed by encoding the link that is generated according to the order identifier and the selected device type identifier, and the second terminal scan and parse the displayed graphic code, to obtain the order identifier and the device type identifier. A to-be-invoked program may be specified in the link. Therefore, when the second terminal clicks the link, the corresponding program can be directly invoked. Then, the device type identifier, the network access data, and the user identifier that are corresponding to the order identifier is uploaded by using the program. The graphic code may be, for example, a two-dimensional code or a barcode. The link may be transferred by using an instant message, an SMS message, or the like. The link may be generated by the IoT open platform. The graphic code may be generated by the IoT open platform or the terminal.

Step 404: Obtain an allocated device serial number corresponding to the order identifier, the device type identifier, the device serial number, and the network access data being written into a customized controlled device.

Specifically, the IoT open platform may allocate, directly or by using another server, the device serial number corresponding to the order identifier, store a correspondence between the order identifier, the device type identifier, the device serial number, and the user identifier, and write, directly or by using another server, the device type identifier, the device serial number, and the network access data into the customized controlled device. The IoT open platform may synchronously send the device serial number to the terminal. The order identifier may further correspond to a quantity of the customized controlled devices. Therefore, the allocated device serial number is consistent with the quantity of the controlled devices.

The network access data written into the controlled device is used to connect the controlled device to a network after the controlled device is powered on. The written-in device type identifier and the device serial number constitute a unique identifier of the controlled device, so that the controlled device may access, after being connected to the network, the IoT open platform according to the device type identifier and the device serial number.

In an exemplary embodiment, step 404 may include sending the order identifier, the network access data, and/or the device type identifier to a device customization server, so that the device customization server allocates the device serial number corresponding to the order identifier, and writes the device type identifier, the device serial number, and the network access data into the customized controlled device; and receiving the device serial number that is corresponding to the order identifier and that is fed back by the device customization server.

Specifically, the device customization server may be a server established by a device vendor to control automatic production processes such as manufacturing and installation of the controlled device. When needing to customize a controlled device, the user may submit an order to the IoT open platform. The IoT open platform controls an automatic production process of the controlled device by using the device customization server, allocates a device serial number to the customized controlled device, and writes a device type identifier, the device serial number, and network access data into the customized controlled device. Certainly, other customized content may also be written into the customized controlled device. The device customization server returns the allocated device serial number to the IoT open platform. The IoT open platform stores the device serial number corresponding to the order identifier, and returns the device serial number to the terminal.

Step 406: Connect to the controlled device that accesses a network according to the network access data and that is identified by using the device serial number and the device type identifier.

Specifically, after being powered on, the controlled device may be connected to the network according to the written-in network access data. For example, a written-in BSSID is searched for, and a network access request carrying a written-in password of the controlled device is sent to a router broadcasting the BSSID, so that the router establish, after password authentication is successful, a network connection to the controlled device, and the controlled device accesses the network.

After accessing the network successfully, the controlled device sends an access request carrying the device type identifier, the device serial number, and a network address corresponding to the controlled device to the IoT open platform, so that the IoT open platform establishes a connection to the controlled device based on the access request, and records a correspondence between the device type identifier, the device serial number, and the network address. The IoT open platform may perform authentication according to the device type identifier and the device serial number that are carried in the access request. If the authentication is successful, the access request of the controlled device is accepted, and a connection to the controlled device is established.

Step 408: Receive a device registration request from the terminal.

Step 410: Perform device registration based on the device type identifier, the device serial number, and the user identifier.

Specifically, the IoT open platform may receive a device registration request carrying an order identifier, so as to obtain a device type identifier, a device serial number, and a user identifier corresponding to the order identifier, and performs device registration according to the obtained device type identifier, the device serial number, and the user identifier. Device registration is mainly to establish an association between a controlled device and a user, so that a user that completes device registration has a right of controlling a corresponding controlled device.

In an exemplary embodiment, the IoT open platform may receive a device registration request carrying a device type identifier, a device serial number, and a user identifier, and perform device registration according to the carried device type identifier, the device serial number, and the user identifier.

In an exemplary embodiment, the IoT open platform may receive a device registration request carrying an order identifier, a device type identifier, a device serial number, and a user identifier, and check whether the carried device type identifier, the device serial number, and the user identifier are consistent with a device type identifier, a device serial number, and a user identifier that are carried in the order identifier. If a check result is that the carried device type identifier, the device serial number, and the user identifier are consistent with a device type identifier, a device serial number, and a user identifier that are carried in the order identifier, device registration is performed according to the carried device type identifier, the device serial number, and the user identifier.

By means of the foregoing method for registering a customized device, a user can customize a controlled device, write network access data used for accessing a network into the customized controlled device, and write a device type identifier and a device serial number that are used for identifying the controlled device into the customized controlled device. In this way, when the controlled device is in an application scenario in which the written-in network access data is used for accessing a network, the controlled device may access the network automatically according to the network data and is connected to a device registration server, thereby improving network access efficiency. The user only needs to trigger a device registration request to enable device registration to be automatically completed, thereby improving device registration efficiency.

In an exemplary embodiment, the receiving a device type identifier, network access data, and a user identifier that are corresponding to an order identifier and that are uploaded by a terminal includes: receiving an order creation request triggered by a first terminal; generating an order identifier according to the order creation request and returning the order identifier to the first terminal, so that the first terminal transfers the order identifier and a selected device type identifier to a second terminal; and receiving the device type identifier, network access data, and a user identifier that are corresponding to the order identifier and that are uploaded by the second terminal; and the receiving a device registration request from the terminal includes: receiving a device registration request from the second terminal. In this exemplary embodiment, the first terminal can help the second terminal to process a order, to generate data for device registration, and the second terminal completes device registration, thereby further improving convenience of device registration.

In an exemplary embodiment, the method for registering a customized device further includes: receiving an order cancellation request from the terminal; and sending the order cancellation request to a device customization server, so that the device customization server clears the device type identifier, the device serial number, and the network access data that are written into the controlled device and that are specified in the order cancellation request.

Specifically, after receiving a customized controlled device, a user may decide whether to return the customized controlled device according to his or her requirement. If deciding to return the customized controlled device, the user sends the controlled device back to a vendor, and sends an order cancellation request by using the terminal. The terminal sends the order cancellation request to the IoT open platform. The IoT open platform sends the order cancellation request to a device customization server. Then, the device customization server clears data in the controlled device specified in the order cancellation request, to delete network access data written into the controlled device, or clears all of a device type identifier, a device serial number, and the network access data that are written into the controlled device. The order cancellation request may carry an order identifier, or may carry a user identifier, or may carry a device type identifier and a device serial number, to specify the controlled device.

In this exemplary embodiment, a user may return a controlled device according to a requirement. A vendor may clear data in a returned controlled device in time, to delete customized content, and subsequently, may write customized content into the controlled device again in response to a customization requirement of another user, so that it is convenient to recycle the controlled device, thereby saving resources. For the IoT open platform and the device customization server, a task of customizing a controlled device is identified by using an order identifier, and user information will not be leaked.

In an exemplary embodiment, step 410 may include: generating a device account according to the device type identifier, the device serial number, and the user identifier; and sending the device account to the controlled device.

Specifically, the device account may include at least one of a number, a letter, and punctuation, and can uniquely identify a corresponding controlled device. After generating a device account, the IoT open platform sends the device account to a controlled device, so that the controlled device subsequently accesses an IoT open platform by using the device account. The IoT open platform sends the device account to a terminal, so that the terminal can subsequently access the controlled device by using device account. After generating the device account, the IoT open platform stores a correspondence between the device account, the user identifier, the device type identifier, and the device serial number. The IoT open platform may subsequently determine, according to the correspondence, the device account of the controlled device that is identified by the device type identifier and the device serial number, and determine a right that is of the corresponding user identifier and that is of controlling the controlled device.

In an exemplary embodiment, the IoT open platform may obtain corresponding signature data according to a device type identifier and a device serial number, and generate a device account according to the user identifier, the device type identifier, and the signature data. The signature data is corresponding to both the device type identifier and the device serial number. The signature data may be used to authenticate validity of a device type identifier and/or a device serial number carried in a registration request. In an exemplary embodiment, the signature data is generated by encrypting the device serial number. An encryption algorithm may be, for example, a message digest algorithm 5 (MD5).

In an exemplary embodiment, the IoT open platform may generate a new and unique device account, and record an association between the device account and a user identifier, a device type identifier, and signature data. The association indicates that the unique device account is generated according to the corresponding user identifier, device type identifier, and signature data.

In an exemplary embodiment, the IoT open platform may obtain a string by combining a user identifier, a device type identifier, and signature data, so as to generate a device account according to the string obtained by combination. To generate a device account according to the string obtained by combination, specifically, the string obtained by combination may be directly used as a device account, or the string obtained by combination may be mapped, by means of a hash algorithm, into a unique device account with a fixed length.

In an exemplary embodiment, the IoT open platform may perform authentication according to signature data. If the authentication is successful, a device account is generated according to a user identifier and a device type identifier, or a device account is generated according to the user identifier, the device type identifier, and the signature data after the authentication is successful; or if the authentication is not successful, a result that device registration is a failure is returned to a terminal.

In an exemplary embodiment, the IoT open platform may decrypt signature data to obtain a device serial number, and compares the device serial number obtained by means of decryption with a device serial number extracted from a device registration request. If the device serial number obtained by means of decryption is consistent with the device serial number extracted from a device registration request, authentication is successful; or if the device serial number obtained by means of decryption is not consistent with the device serial number extracted from a device registration request, authentication is a failure.

In an exemplary embodiment, the method for registering a customized device further includes: obtaining a tracking number associated with the order identifier; obtaining logistics information corresponding to the tracking number; and sending the logistics information to the terminal according to the user identifier corresponding to the order identifier.

Specifically, after writing data into a controlled device, a vendor may deliver the controlled device to a logistics company, and the logistics company transports the controlled device to a location of a user. The logistics company generates corresponding tracking number when receiving a task of transporting the controlled device. A device customization server associates the tracking number with an order identifier, and synchronously sends the association to the IoT open platform.

When receiving a logistics information query request of a terminal, the IoT open platform may obtain an order identifier specified in the logistics information query request, obtain a tracking number associated with the order identifier, actively or passively obtain logistics information that is corresponding to the tracking number and that is from a logistics server of the logistics company, and pushes the logistics information to the terminal.

In this exemplary embodiment, the order identifier is associated with an tracking number of the customized controlled device. The IoT open platform may synchronously send a transportation status of the customized controlled device to the terminal, so that the terminal can learn the transportation status of the customized controlled device in time, thereby improving convenience of the customization, transportation, and use of the controlled device.

Figure 5:
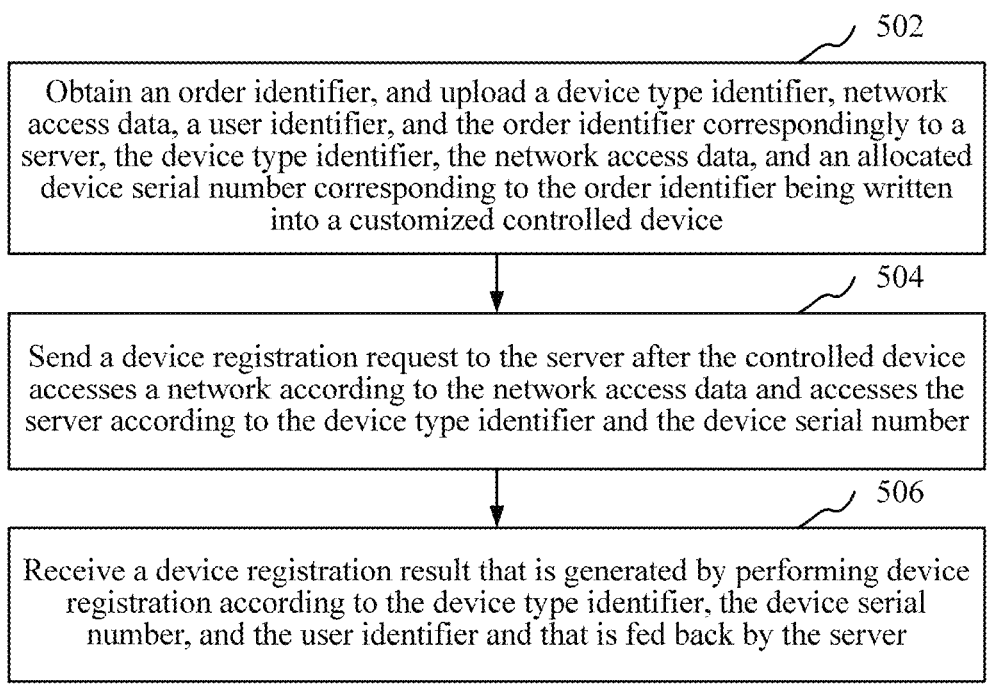
FIG. 5 is a schematic flowchart of a method for registering a customized device according to another exemplary embodiment.

As shown in FIG. 5, in an exemplary embodiment, a method for registering a customized device is provided. In this exemplary embodiment, descriptions are made by using that the method is applied to the foregoing terminal 120 (1) shown in the FIG. 1 an example. The method may include the following steps:

Step 502: Obtain an order identifier, and upload a device type identifier, network access data, a user identifier, and the order identifier correspondingly to a server, the device type identifier, the network access data, and an allocated device serial number corresponding to the order identifier being written into a customized controlled device.

The order identifier is an only identifier of an order. An order represents a task of customizing a controlled device. The order includes the device type identifier representing a type of the customized controlled device, the network access data, and a user identifier of an actual user representing the controlled device. The network access data is data needed for accessing a network, for example, a BSSID and a corresponding password of a router in the user's house, or a network dial account and a corresponding password. There may be multiple pieces of network access data. The user identifier is a unique string for identifying the user. The user may customize appearance, package, embedded-in software content, and the like of the controlled device, other than the network access data of the controlled device. Customized content is corresponding to the order identifier.

Specifically, the terminal may access a device customization page provided by the IoT open platform, and triggers an order creation request and sends the order creation request to the IoT open platform in the device customization page. Then, the IoT open platform generates an order identifier and feeds the order identifier back to the terminal, and the terminal receives the order identifier fed back by the IoT open platform.

In the device customization page, type options of the customized controlled device may be provide. The terminal selects a corresponding type option according to a user operation, and obtains a device type identifier corresponding to the selected type option. The terminal may obtain network access data entered on the device customization page, obtain a user identifier used for current login, and upload the device type identifier, the network access data, the user identifier, and the order identifier correspondingly to the IoT open platform. The IoT open platform receives and stores the device type identifier, the network access data, the user identifier, and the order identifier.

In an exemplary embodiment, the terminal may obtain a link, obtain an order identifier and a device type identifier link that are included in the link, enter a device customization page according to a link invoking program, obtain network access data entered on the device customization page, obtain a user identifier used for current login, and upload the device type identifier, the network access data, the user identifier, and the order identifier correspondingly to the IoT open platform.

The link may be obtained from a graphic code, an instant message, or an SMS message. The invoked program is a program having functions of device registration and accessing a controlled device, and may be a social application or a dedicated application for controlling a controlled device. The social application may include an instant messaging application or a social networking service (SNS) application, or the like. The link may be shared with another terminal, and may be shared by using a graphic code, an instant message, or an SMS message.

The IoT open platform may allocate, directly or by using another server, the device serial number according to the order identifier, store a correspondence between the order identifier, the device type identifier, the device serial number, and the user identifier, and write, directly or by using another server, the device type identifier, the device serial number, and the network access data into the customized controlled device. The IoT open platform may synchronously send the device serial number to the terminal. The order identifier may further correspond to a quantity of the customized controlled devices. Therefore, the allocated device serial number is consistent with the quantity of the controlled devices.

The network access data written into the controlled device is used to connect the controlled device to a network after the controlled device is powered on. The written-in device type identifier and the device serial number constitute a unique identifier of the controlled device, so that the controlled device may access, after being connected to the network, the IoT open platform according to the device type identifier and the device serial number.

In an exemplary embodiment, the device serial number is allocated correspondingly to the order identifier after the device customization server receives the order identifier, the network access data, and the device type identifier that are sent by the IoT open platform, and the device type identifier, the device serial number, and the network access data are written by the device customization server into the customized controlled device.

Step 504: Send a device registration request to the server after the controlled device accesses a network according to the network access data and accesses the server according to the device type identifier and the device serial number.

Specifically, after being powered on, the controlled device may be connected to the network according to the written-in network access data. For example, a written-in BSSID is searched for, and a network access request carrying a written-in password of the controlled device is sent to a router broadcasting the BSSID, so that the router establish, after password authentication is successful, a network connection to the controlled device, and the controlled device accesses the network.

After accessing the network successfully, the controlled device sends an access request carrying the device type identifier, the device serial number, and a network address corresponding to the controlled device to the IoT open platform, so that the IoT open platform establishes a connection to the controlled device according to the access request, and records a correspondence between the device type identifier, the device serial number, and the network address. The IoT open platform may perform authentication according to the device type identifier and the device serial number that are carried in the access request. If the authentication is successful, the access request of the controlled device is accepted, and a connection to the controlled device is established.

Step 506: Receive a device registration result that is generated by performing device registration according to the device type identifier, the device serial number, and the user identifier and that is fed back by the server.

Specifically, the terminal may initiate a device registration request carrying an order identifier, and send the device registration request to the IoT open platform, so that the IoT open platform receives the device registration request, obtains a device type identifier, a device serial number, and a user identifier that are corresponding to the order identifier, and performs device registration according to the obtained device type identifier, device serial number, and the user identifier. Device registration is mainly to establish an association between a controlled device and a user, so that a user that completes device registration has a right of controlling a corresponding controlled device.

In an exemplary embodiment, the IoT open platform may receive a device registration request carrying a device type identifier, a device serial number, and a user identifier, and perform device registration according to the carried device type identifier, the device serial number, and the user identifier.

In an exemplary embodiment, the IoT open platform may receive a device registration request carrying an order identifier, a device type identifier, a device serial number, and a user identifier, and check whether the carried device type identifier, the device serial number, and the user identifier are consistent with a device type identifier, a device serial number, and a user identifier that are carried in the order identifier. If a check result is that the carried device type identifier, the device serial number, and the user identifier are consistent with the device type identifier, the device serial number, and a user identifier that are carried in the order identifier, device registration is performed according to the carried device type identifier, the device serial number, and the user identifier.

By means of the foregoing method for registering a customized device, a user can customize a controlled device, write network access data used for accessing a network into the customized controlled device, and write a device type identifier and a device serial number that are used for identifying the controlled device into the customized controlled device. In this way, when the controlled device is in an application scenario in which the written-in network access data is used for accessing a network, the controlled device may access the network automatically according to the network data and is connected to a device registration server, thereby improving network access efficiency. The user only needs to trigger a device registration request to enable device registration to be automatically completed, thereby improving device registration efficiency.

In an exemplary embodiment, the terminal may send an order cancellation request to the IoT open platform, so that the IoT open platform sends the order cancellation request to a device customization server, and the device customization server clears the device type identifier, the device serial number, and the network access data that are written into the controlled device and that are specified in the order cancellation request.

In an exemplary embodiment, a device registration result carries a device account generated according to a device type identifier, a device serial number, and a user identifier. The method for registering a customized device may further include: accessing a controlled device according to the device account by using a server.

Specifically, the device account may include at least one of a number, a letter, and punctuation, and can uniquely identify a corresponding controlled device. After generating a device account, the IoT open platform sends the device account to a controlled device, so that the controlled device subsequently accesses the IoT open platform by using the device account. The IoT open platform sends the device account to a terminal, so that the terminal can subsequently access the controlled device by using the device account. After generating the device account, the IoT open platform stores a correspondence between the device account, the user identifier, the device type identifier, and the device serial number. The IoT open platform may subsequently determine, according to the correspondence, the device account of the controlled device that is identified by the device type identifier and the device serial number, and determine a right that is of the corresponding user identifier and that is of controlling the controlled device. The terminal may request the IoT open platform to deregister a registered controlled device, so that the IoT open platform deregisters a corresponding device account, to unbind the controlled device from a user.

In this exemplary embodiment, after device registration is completed, the terminal is bound to the controlled device. The terminal interacts with the controlled device by means of the device account, so as to avoid leaking the device serial number, thereby ensuring communication security.

In an exemplary embodiment, the method for registering a customized device may further include: displaying, by using an unregistered-device information query portal, first device-related information and a registration widget that are corresponding to the controlled device; triggering the device registration request when a specified operation performed on the registration widget is detected; and displaying, by using a registered-device information query portal after the device registration result is received, second device-related information and an access portal that are corresponding to the controlled device.

Figure 6:
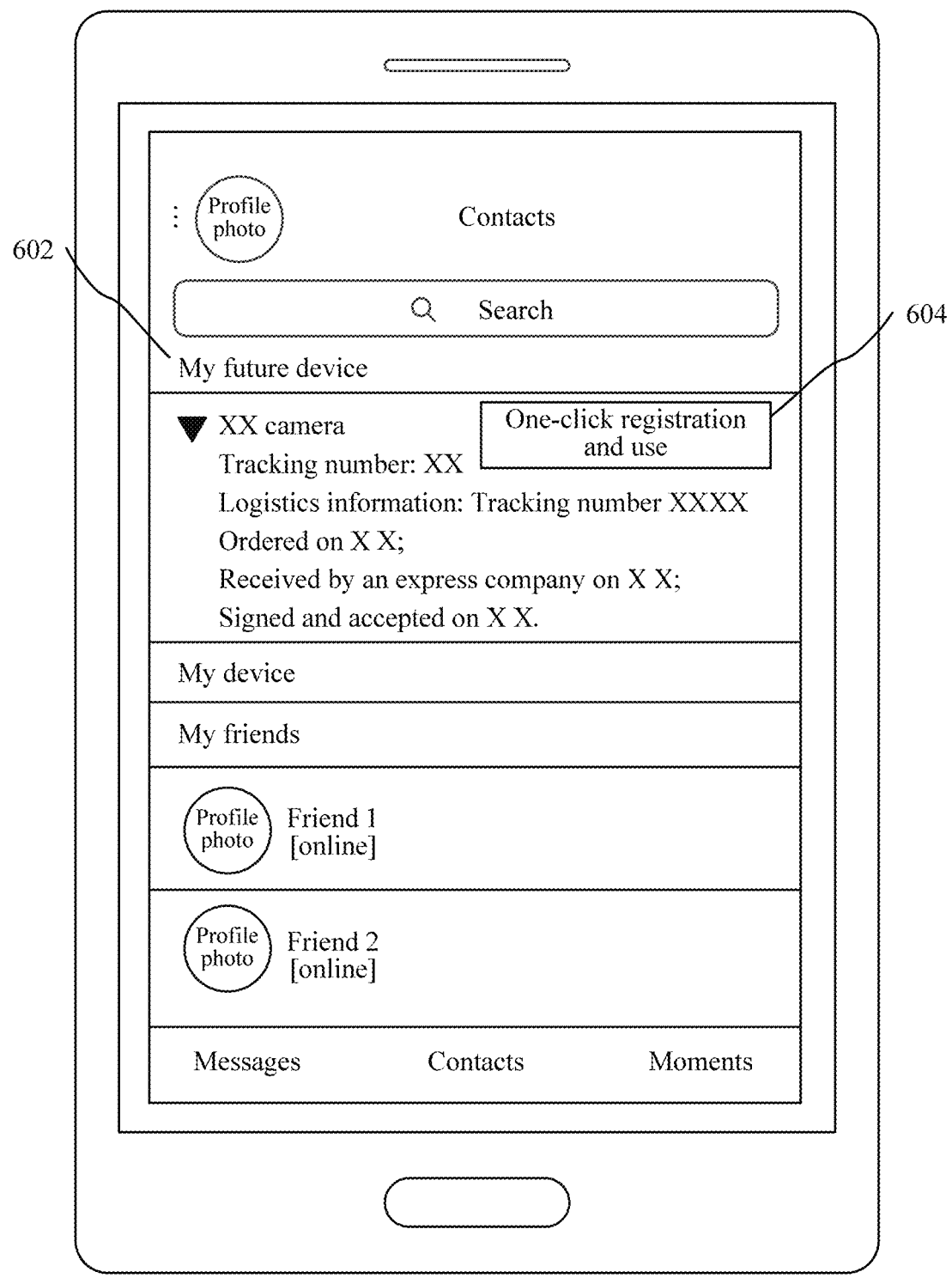
FIG. 6 is a schematic diagram of an unregistered-device information query portal in a social application according to an exemplary embodiment.

Specifically, the unregistered-device information query portal is a portal used to query information of a controlled device that already has an order identifier and that is not registered, for example, a node 602 of "my future device" shown in FIG. 6. The registered-device information query portal is a portal used to query information of a registered controlled device, for example, a node 802 of "my device" shown in FIG. 8. The registration widget is used to trigger a device registration request, and may be in a form of an icon or a text link or a button, for example, a button 604 of "one-click registration and use" shown in FIG. 6.

After creating an order, a user may query, by using an unregistered-device information query portal 602 of a social application, first device-related information of a controlled device corresponding to an order identifier. The first device-related information is, for example, a device name, a device type identifier, a device icon, a tracking number, an order identifier, logistics information, or the like. A registration widget 604 may be displayed by using the unregistered-device information query portal 602.

Figure 7:
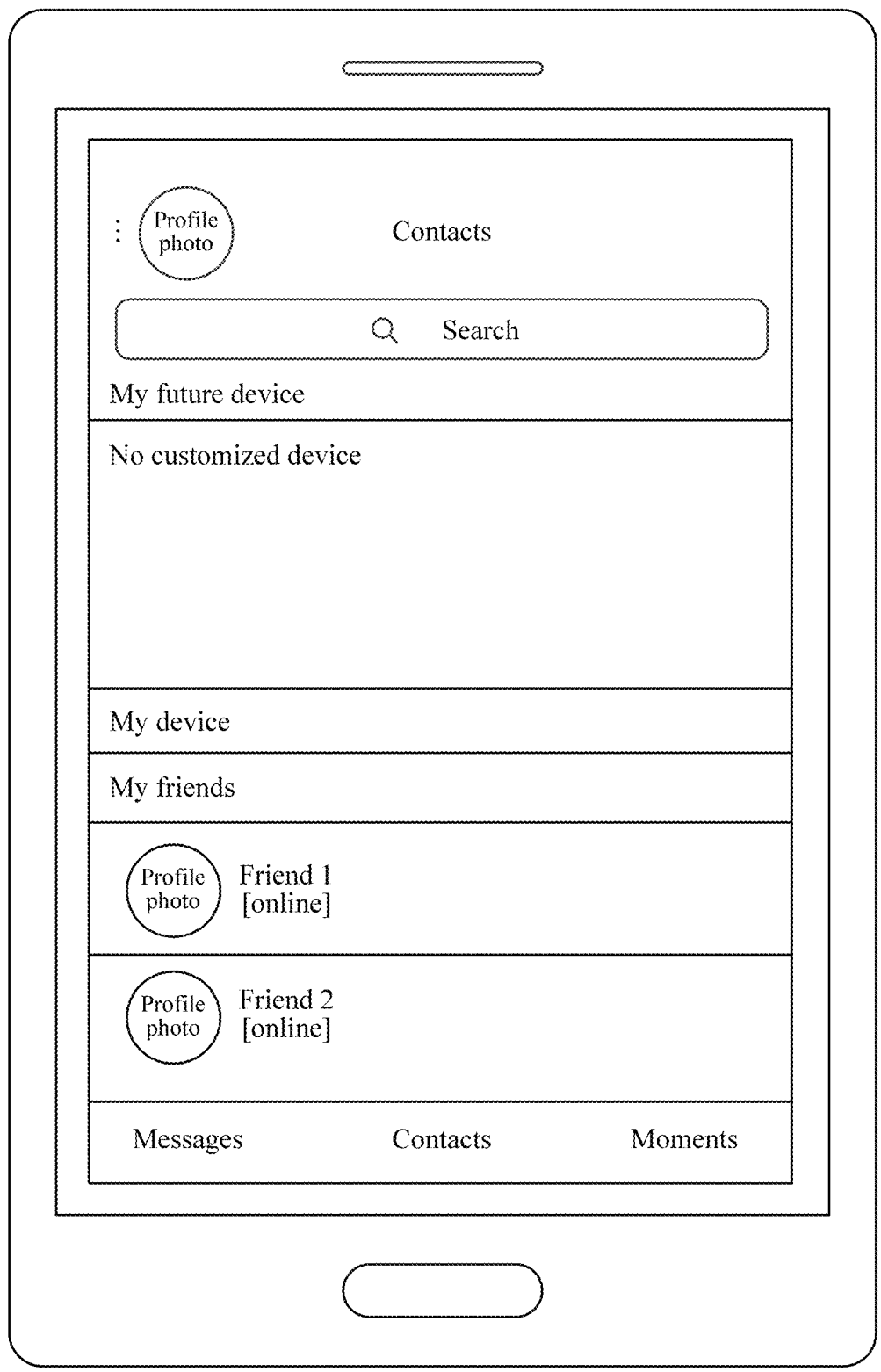
FIG. 7 is a schematic diagram of an unregistered-device information query portal in a social application according to an exemplary embodiment.
Figure 8:
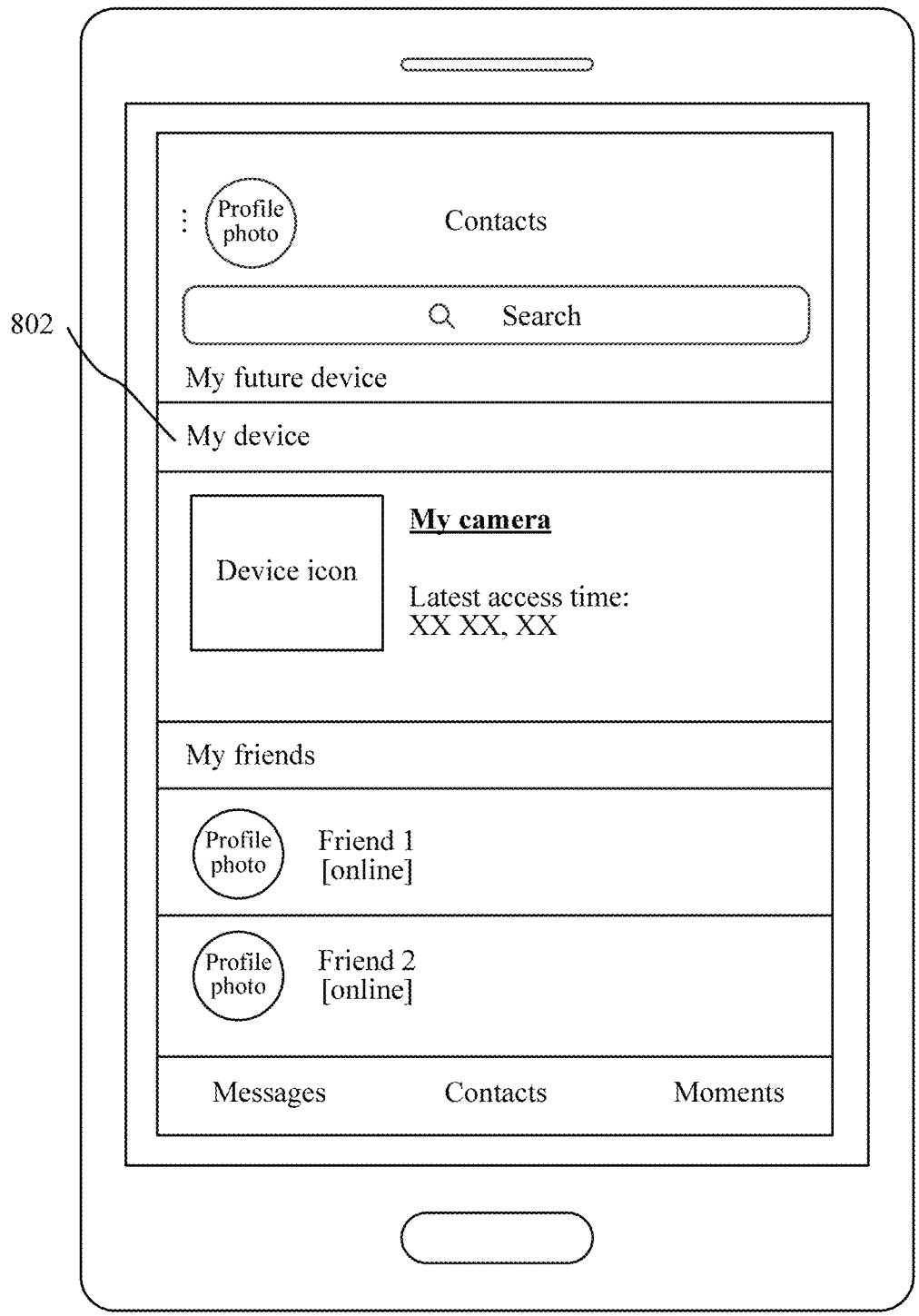
FIG. 8 is a schematic diagram of a registered-device information query portal in a social application according to an exemplary embodiment.

After receiving the controlled device, the user may click the registration widget 604 to trigger a device registration request. After receiving a device registration result indicating that registration is successful, the terminal clears the first device-related information in the unregistered-device information query portal 602, as shown in FIG. 7; and displays, by using the registered-device information query portal, second device-related information and an access portal that are corresponding to the controlled device, as shown in FIG. 8. The second device-related information is, for example, a device icon, a device name, an access history, and the like. The access portal is used to trigger to access the controlled device, and may be an icon link or a text link, for example, a link contained in a device icon or a link contained in a device name.

In this exemplary embodiment, controlled device-related information is classified into information before registration and information after registration by using different query portals, so that it is convenient for a user to learn a status of a customized controlled device, and it is quite convenient and rapid to trigger a device registration request, thereby improving convenience of using the controlled device.

Figure 9:
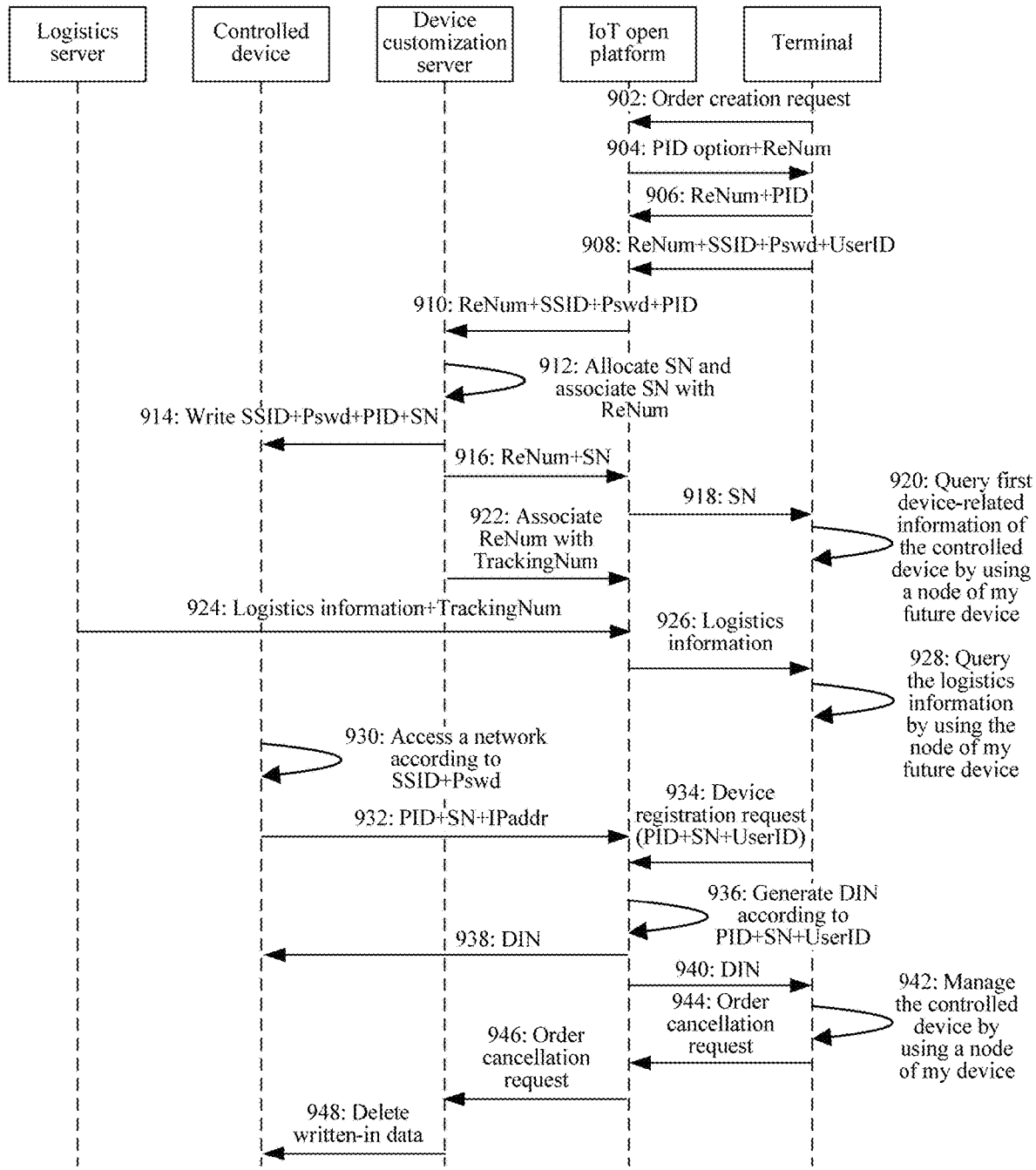
FIG. 9 is a schematic flowchart of a method for registering a customized device according to an exemplary embodiment.

As shown in FIG. 9, in an exemplary embodiment, a method for registering a customized device is provided, may include the following steps:

Step 902: A terminal displays a device customization page provided by an IoT open platform, and sends an order creation request to the IoT open platform.

Step 904: The IoT open platform generates an order identifier ReNum according to the order creation request, feeds the order identifier ReNum back to the terminal, and provides type options, that is, PID options of a controlled device that can be customized to the terminal.

Step 906: The terminal performs selection in optional PID options according to a user operation, obtains a device type identifier PID corresponding to a selected PID option, and uploads the device type identifier PID and the order identifier ReNum correspondingly to the IoT open platform, so that the IoT open platform stores the order identifier ReNum and the device type identifier PID correspondingly.

Step 908: The terminal obtains the order identifier ReNum and the device type identifier PID, invokes a social application to enter a device customization page, obtains a BSSID and a password Pswd that are entered on the device customization page, obtains a user identifier UserID used for current login, and uploads the BSSID, the password Pswd, and the user identifier UserID that are corresponding to the order identifier ReNum to the IoT open platform, so that the IoT open platform stores the order identifier ReNum, the BSSID, the password Pswd, the device type identifier PID, and the user identifier UserID correspondingly.

Step 910: The IoT open platform sends the order identifier ReNum, the BSSID, the password Pswd, and the device type identifier PID to a device customization server.

Step 912: The device customization server allocates a device serial number SN, and associates the device serial number SN with the order identifier ReNum, that is, makes the device serial number SN correspond to the order identifier ReNum.

Step 914: The device customization server writes the BSSID, the password Pswd, the device type identifier PID, and the device serial number SN into the customized controlled device.

Step 916: The device customization server synchronously sends the association between the device serial number SN and the order identifier ReNum to the IoT open platform.

Step 918: The IoT open platform sends the device serial number SN to the terminal corresponding to the user identifier UserID that is corresponding to the associated order identifier ReNum.

Step 920: The terminal may query first device-related information such as the device serial number SN of the controlled device by means of a node of "my future device".

Step 922: The device customization server associates the order identifier ReNum with a tracking number TrackingNum, and synchronously sends the association to the IoT open platform.

Step 924: A logistics server may send logistics information corresponding to the tracking number TrackingNum to the IoT open platform.

Step 926: The IoT open platform obtains the order identifier ReNum associated with the tracking number TrackingNum, and pushes, according to the order identifier ReNum, the logistics information to the corresponding terminal.

Step 928: The terminal may query the logistics information of the customized controlled device by means of the node of "my future device".

Step 930: After being powered on, the controlled device accesses a network according to the BSSID and the password Pswd written into the controlled device.

Step 932: The controlled device sends the device type identifier PID, the device serial number SN, and a network address IPaddr of the controlled device to the IoT open platform, so that the IoT open platform stores a correspondence between the device type identifier PID, the device serial number SN, and the network address IPaddr.

Step 934: The terminal click a registration widget at the node of "my future device", triggers a device registration request carrying a device type identifier PID, a device serial number SN, and a user identifier UserID, and sends the device registration request to the IoT open platform.

Step 936: The IoT open platform receives the device registration request, extracts the device type identifier PID, the device serial number SN, and the user identifier UserID, and generates a device account DIN according to the device type identifier PID, the device serial number SN, and the user identifier UserID.

Step 938: The IoT open platform sends the device account DIN to the controlled device according to the network address IPaddr corresponding to the device type identifier PID and the device serial number SN.

Step 940: The IoT open platform feeds a device registration result carrying the device account DIN back to the terminal.

Step 942: The terminal may query, by means of a node of "my device", second device-related information of the registered customized device.

Step 944: The terminal may send an order cancellation request to the IoT open platform.

Step 946: The IoT open platform forwards the order cancellation request to the device customization server.

Step 948: The device customization server clears, according to the order cancellation request, the BSSID, the password Pswd, the device type identifier PID, and the device serial number SN that are written into the controlled device.

By means of the foregoing method for registering a customized device, a user can customize a controlled device, write network access data used for accessing a network into the customized controlled device, and write a device type identifier and a device serial number that are used for identifying the controlled device into the customized controlled device. In this way, when the controlled device is in an application scenario in which the written-in network access data is used for accessing a network, the controlled device may access the network automatically according to the network data and is connected to a device registration server, thereby improving network access efficiency. The user only needs to trigger a device registration request to enable device registration to be automatically completed, thereby improving device registration efficiency.

A user may return a controlled device according to a requirement. A vendor may clear data in a returned controlled device in time, to delete customized content, and subsequently, may write customized content into the controlled device again in response to a customization requirement of another user, so that it is convenient to recycle the controlled device, thereby saving resources. For the IoT open platform and the device customization server, a task of customizing a controlled device is identified by using an order identifier, and user information will not be leaked.

The order identifier is associated with an tracking number of the customized controlled device. The IoT open platform may synchronously send a transportation status of the customized controlled device to the terminal, so that the terminal can learn the transportation status of the customized controlled device in time, thereby improving convenience of the customization, transportation, and use of the controlled device.

Figure 10:
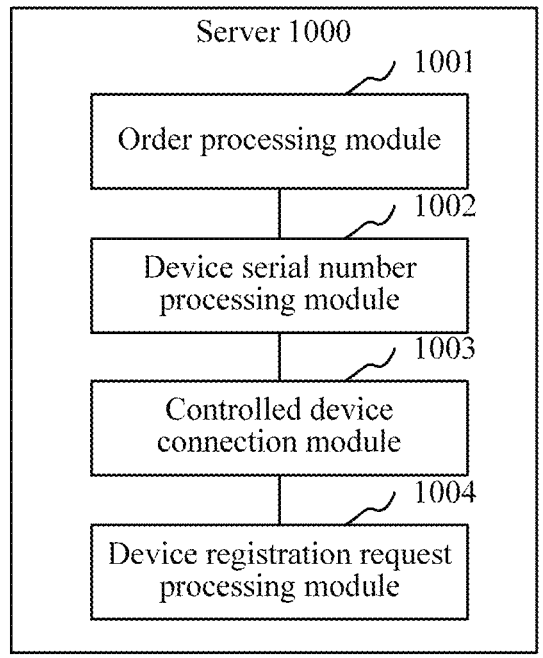
FIG. 10 is a structural block diagram of a server according to an exemplary embodiment.

As shown in FIG. 10, in an exemplary embodiment, a server 1000 is provided. An internal structure of the server may correspond to the structure shown in FIG. 2. All or some of the modules described below may be implemented by software, hardware, or a combination thereof. The server 1000 includes an order processing module 1001, a device serial number processing module 1002, a controlled device connection module 1003, and a device registration request processing module 1004.

The order processing module 1001 is configured to receive a device type identifier, network access data, and a user identifier that are corresponding to an order identifier and that are uploaded by a terminal.

The device serial number processing module 1002 is configured to obtain an allocated device serial number corresponding to the order identifier, the device type identifier, the device serial number, and the network access data being written into a customized controlled device.

The controlled device connection module 1003 is configured to: connect to the controlled device that accesses a network according to the network access data and that is identified by using the device serial number and the device type identifier.

The device registration request processing module 1004 is configured to: receive a device registration request from the terminal; and perform device registration according to the device type identifier, the device serial number, and the user identifier.

By means of the server 1000, a user can customize a controlled device, write network access data used for accessing a network into the customized controlled device, and write a device type identifier and a device serial number that are used for identifying the controlled device into the customized controlled device. In this way, when the controlled device is in an application scenario in which the written-in network access data is used for accessing a network, the controlled device may access the network automatically according to the network data and is connected to a device registration server, thereby improving network access efficiency. The user only needs to trigger a device registration request to enable device registration to be automatically completed, thereby improving device registration efficiency.

In an exemplary embodiment, the device serial number processing module 1002 is further configured to send the order identifier, the network access data, and the device type identifier to a device customization server, so that the device customization server allocates the device serial number corresponding to the order identifier, and writes the device type identifier, the device serial number, and the network access data into the customized controlled device; and receive the device serial number that is corresponding to the order identifier and that is fed back by the device customization server.

In an exemplary embodiment, the device registration request processing module 1004 is further configured to: generate a device account according to the device type identifier, the device serial number, and the user identifier; send the device account to the controlled device; and send the device account to the terminal.

Figure 11:
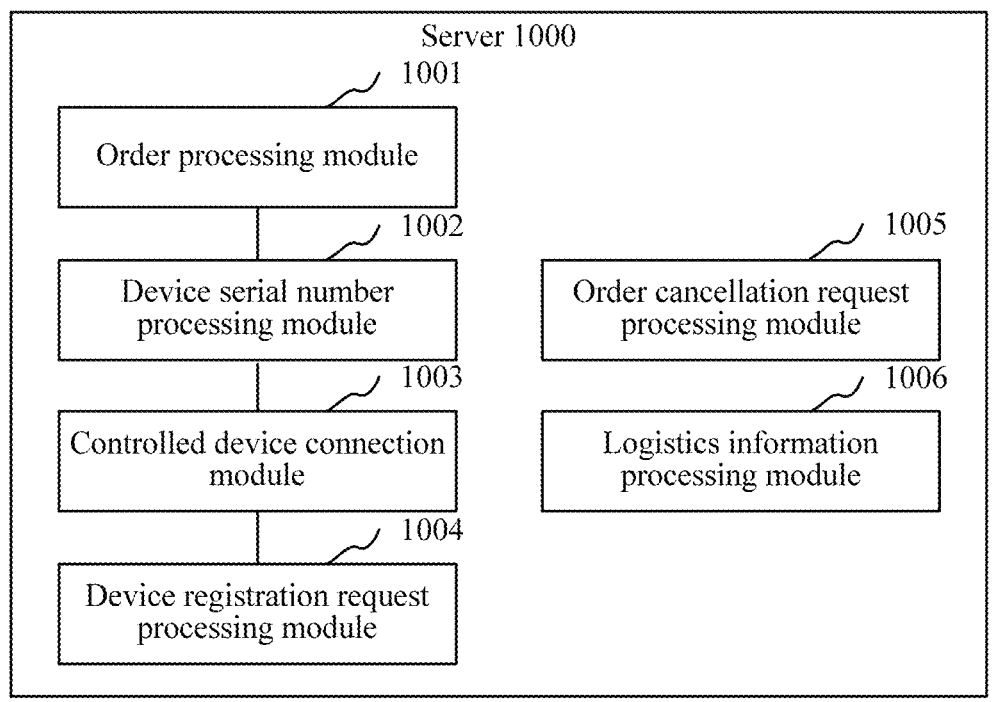
FIG. 11 is a structural block diagram of a server according to an exemplary embodiment.

As shown in FIG. 11, in an exemplary embodiment, the server 1000 may further include at least one of an order cancellation request processing module 1005 and a logistics information processing module 1006.

The order cancellation request processing module 1005 is configured to: receive an order cancellation request from a terminal; send the order cancellation request to a device customization server, so that the device customization server clears a device type identifier, a device serial number, and network access data that is written into a controlled device and that is specified in the order cancellation request.

The logistics information processing module 1006 is configured to: obtain a tracking number associated with an order identifier; obtain logistics information corresponding to the tracking number; and send the logistics information to the terminal according to a user identifier corresponding to the order identifier.

Figure 12:
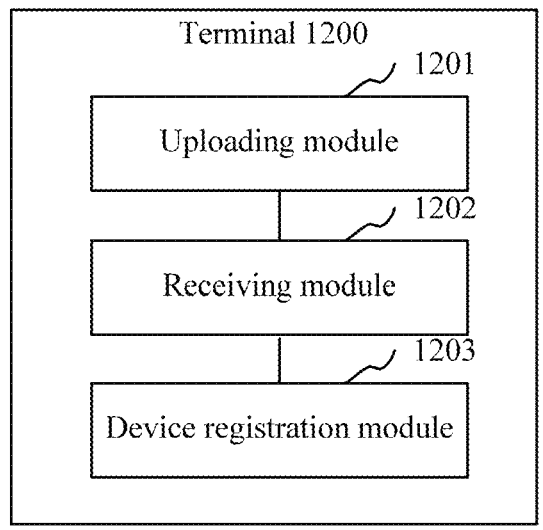
FIG. 12 is a structural block diagram of a terminal according to an exemplary embodiment.

As shown in FIG. 12, in an exemplary embodiment, a terminal 1200 is provided. An internal structure of the terminal 1200 may correspond to the structure shown in FIG. 3. All or some of the modules described below may be implemented by software, hardware, or a combination thereof. The terminal 1200 includes: an uploading module 1201, a receiving module 1202, and a device registration module 1203.

The uploading module 1201 is configured to: obtain an order identifier, and upload a device type identifier, network access data, a user identifier, and the order identifier correspondingly to a server.

The receiving module 1202 is configured to receive an allocated device serial number that is corresponding to the order identifier and that is fed back by the server, the device type identifier, the device serial number, and the network access data being written into a customized controlled device.

The device registration module 1203 is configured to: send a device registration request to the server after the controlled device accesses a network according to the network access data and accesses the server according to the device type identifier and the device serial number; and receive a device registration result that is generated by performing device registration according to the device type identifier, the device serial number, and the user identifier and that is fed back by the server.

By means of the terminal 1200, a user can customize a controlled device, write network access data used for accessing a network into the customized controlled device, and write a device type identifier and a device serial number that are used for identifying the controlled device into the customized controlled device. In this way, when the controlled device is in an application scenario in which the written-in network access data is used for accessing a network, the controlled device may access the network automatically according to the network data and is connected to a device registration server, thereby improving network access efficiency. The user only needs to trigger a device registration request to enable device registration to be automatically completed, thereby improving device registration efficiency.

Figure 13:
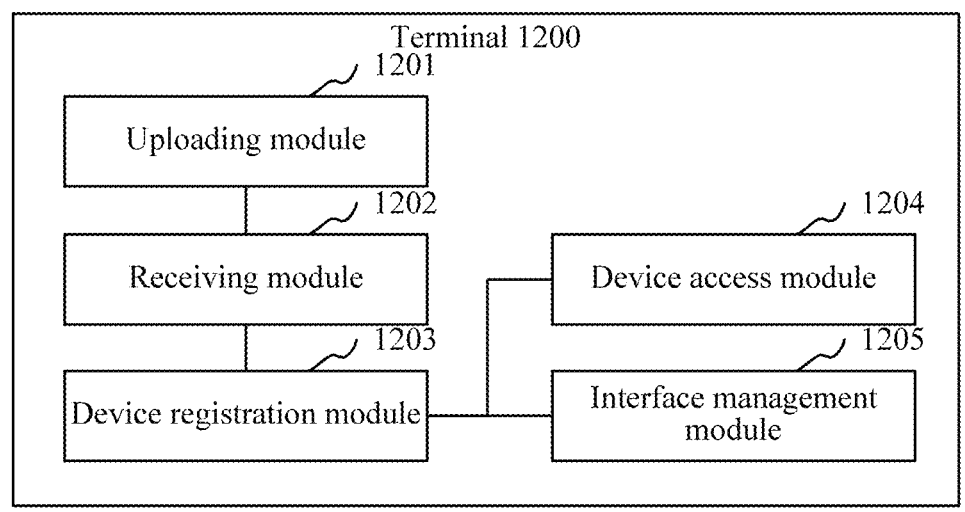
FIG. 13 is a structural block diagram of a terminal according to an exemplary embodiment.

In an exemplary embodiment, the device registration result carries a device account generated according to the device type identifier, the device serial number, and the user identifier. As shown in FIG. 13, the terminal 1200 further includes a device access module 1204, configured to access the controlled device according to the device account by using the server.

As shown in FIG. 13, in an exemplary embodiment, the terminal 1200 further includes an interface management module 1205, configured to: display, by using an unregistered-device information query portal, first device-related information and a registration widget that are corresponding to a controlled device; trigger a device registration request when a specified operation performed on the registration widget is detected; and display, by using a registered-device information query portal after a device registration result is received, second device-related information and an access portal that are corresponding to the controlled device.

In an exemplary embodiment, a server is provided, including a memory and a processor, the memory storing computer readable instructions, and the computer readable instructions, when executed by the processor, causing the processor to perform the following steps: receiving a device type identifier, network access data, and a user identifier that are corresponding to an order identifier and that are uploaded by a terminal; obtaining an allocated device serial number corresponding to the order identifier, the device type identifier, the device serial number, and the network access data being written into a customized controlled device; connecting to the controlled device that accesses a network according to the network access data and that is identified by using the device serial number and the device type identifier; receiving a device registration request from the terminal; and in response to the device registration request, performing device registration according to the device type identifier, the device serial number, and the user identifier.

In an exemplary embodiment, the receiving a device type identifier, network access data, and a user identifier that are corresponding to an order identifier and that are uploaded by a terminal includes: receiving an order creation request triggered by a first terminal; generating an order identifier according to the order creation request and returning the order identifier to the first terminal, so that the first terminal transfers the order identifier and a selected device type identifier to a second terminal; and receiving the device type identifier, network access data, and a user identifier that are corresponding to the order identifier and that are uploaded by the second terminal; and the receiving a device registration request from the terminal includes: receiving a device registration request from the second terminal.

In an exemplary embodiment, the obtaining an allocated device serial number corresponding to the order identifier includes: sending the order identifier, the network access data, and the device type identifier to a device customization server, so that the device customization server allocates the device serial number corresponding to the order identifier, and writes the device type identifier, the device serial number, and the network access data into the customized controlled device; and receiving the device serial number that is corresponding to the order identifier and that is fed back by the device customization server.

In an exemplary embodiment, the computer readable instructions, when executed by the processor, further cause the processor to perform the following steps: receiving an order cancellation request from the terminal; and sending the order cancellation request to a device customization server, so that the device customization server clears the device type identifier, the device serial number, and the network access data that are written into the controlled device and that are specified in the order cancellation request.

In an exemplary embodiment, the performing device registration according to the device type identifier, the device serial number, and the user identifier includes: generating a device account according to the device type identifier, the device serial number, and the user identifier; sending the device account to the controlled device; and sending the device account to the terminal.

In an exemplary embodiment, the computer readable instructions, when executed by the processor, cause the processor to perform the following steps: obtaining a tracking number associated with the order identifier; obtaining logistics information corresponding to the tracking number;

and sending the logistics information to the terminal according to the user identifier corresponding to the order identifier.

By means of the foregoing server, a user can customize a controlled device, write network access data used for accessing a network into the customized controlled device, and write a device type identifier and a device serial number that are used for identifying the controlled device into the customized controlled device. In this way, when the controlled device is in an application scenario in which the written-in network access data is used for accessing a network, the controlled device may access the network automatically according to the network data and is connected to a device registration server, thereby improving network access efficiency. The user only needs to trigger a device registration request to enable device registration to be automatically completed, thereby improving device registration efficiency.

In an exemplary embodiment, a terminal is provided, including a memory and a processor, the memory storing computer readable instructions, and the computer readable instructions, when executed by the processor, causing the processor to perform the following steps: obtaining an order identifier, and uploading a device type identifier, network access data, a user identifier, and the order identifier correspondingly to a server, the device type identifier, the network access data, and an allocated device serial number corresponding to the order identifier being written into a customized controlled device; sending a device registration request to the server after the controlled device accesses a network according to the network access data and accesses the server according to the device type identifier and the device serial number; and receiving a device registration result that is generated by performing device registration according to the device type identifier, the device serial number, and the user identifier and that is fed back by the server.

In an exemplary embodiment, the obtaining an order identifier, and uploading a device type identifier, network access data, a user identifier, and the order identifier correspondingly to a server includes: obtaining a link, and obtaining an order identifier and a device type identifier included in the link; invoking a program according to the link, to enter a device customization page; obtaining network access data entered on the device customization page; obtaining a user identifier used for current login; and uploading the device type identifier, the network access data, the user identifier, and the order identifier correspondingly to the server.

In an exemplary embodiment, the device registration result carries a device account generated according to the device type identifier, the device serial number, and the user identifier; and the computer readable instructions, when executed by the processor, further cause the processor to perform the following step: accessing the controlled device by using the server according to the device account.

In an exemplary embodiment, the computer readable instructions, when executed by the processor, cause the processor to perform the following steps: displaying, by using an unregistered-device information query portal, first device-related information and a registration widget that are corresponding to the controlled device; triggering the device registration request when a specified operation performed on the registration widget is detected; and displaying, by using a registered-device information query portal after the device registration result is received, second device-related information and an access portal that are corresponding to the controlled device.

By means of the foregoing terminal, a user can customize a controlled device, write network access data used for accessing a network into the customized controlled device, and write a device type identifier and a device serial number that are used for identifying the controlled device into the customized controlled device. In this way, when the controlled device is in an application scenario in which the written-in network access data is used for accessing a network, the controlled device may access the network automatically according to the network data and is connected to a device registration server, thereby improving network access efficiency. The user only needs to trigger a device registration request to enable device registration to be automatically completed, thereby improving device registration efficiency.

A person of ordinary skill in the technology may understand that all or some of the processes of the methods in the exemplary embodiments may be implemented by a computer program that instructs relevant hardware. The computer program may be stored in a computer readable storage medium. When the program runs, the processes of the methods in the exemplary embodiments are performed. The storage medium may be a non-volatile storage medium such as a magnetic disk, an optical disc, or a read-only memory (ROM), or may be a random access memory (RAM) or the like.

Technical features of the foregoing exemplary embodiments may be randomly combined. To make the description concise, not all possible combinations of the technical features in the foregoing exemplary embodiments are described. However, as long as combinations of these technical features do not contradict each other, it should be considered that the combinations all fall within the scope recorded by this specification.

The foregoing exemplary embodiments only describe several implementations of this application, which are described specifically and in detail, and therefore cannot be construed as a limitation to the patent scope of the present application. It should be noted that a person of ordinary skill in the technology may make various changes and improvements without departing from the ideas of this application, which shall all fall within the protection scope of this application. Therefore, the protection scope of the patent of this application shall be subject to the appended claims.

What is claimed is:

1. A method performed by at least one computer processor of a server, the method comprising:
    obtaining a device type identifier, network access data, a user identifier, and an allocated device serial number, corresponding to an order identifier of which generation is triggered by a first terminal, the order identifier identifying an order to customize a controlled device that has not been registered and is different from the first terminal, wherein the device type identifier, the allocated device serial number, and the network access data are written into the customized controlled device;
    connecting to the customized controlled device that is identified by the allocated device serial number and the device type identifier;
    receiving a device registration request for registering the customized controlled device from a second terminal that is different from the customized controlled device; and
    in response to receiving the device registration request, performing device registration with the server on the customized controlled device based on the device type identifier, the allocated device serial number, and the user identifier.

2. The method according to claim 1, wherein the obtaining comprises:
receiving an order creation request from the first terminal;
generating the order identifier based on the order creation request and transmitting the order identifier to the first terminal; and
receiving the device type identifier, the network access data, and the user identifier that correspond to the order identifier from the second terminal, wherein the second terminal is different from the first terminal.

3. The method according to claim 1, wherein the obtaining comprises:
sending the order identifier, the network access data, and the device type identifier to a device customization server; and
receiving the allocated device serial number that corresponds to the order identifier from device customization server.

4. The method according to claim 1, further comprising:
receiving an order cancellation request from the terminal; and
sending the order cancellation request to a device customization server for clearing the device type identifier, the device serial number, and the network access data that are written into the controlled device and that are specified in the order cancellation request.

5. The method according to claim 1, wherein the performing the device registration comprises:
generating a device account according to the device type identifier, the device serial number, and the user identifier;
sending the device account to the controlled device; and
sending the device account to the terminal.

6. The method according to claim 1, further comprising:
obtaining a tracking number associated with the order identifier;
obtaining logistics information corresponding to the tracking number; and
sending the logistics information to the terminal according to the user identifier corresponding to the order identifier.

7. A server comprising:
at least one memory configured to store computer program code; and
at least one processor configured to access the at least one memory and operate according to the computer program code, said computer program code including code to implement:
obtaining a device type identifier, network access data, a user identifier, and an allocated device serial number corresponding to an order identifier of which generation is triggered by a first terminal, the order identifier identifying an order to customize a controlled device that has not been registered and is different from the first terminal, wherein the device type identifier, the allocated device serial number, and the network access data are written into the customized controlled device;
connecting to the customized controlled device that is identified by the allocated device serial number and the device type identifier;
receiving a device registration request for registering the customized controlled device from a second terminal that is different from the customized controlled device; and
in response to receiving the device registration request, performing device registration with the server on the customized controlled device based on the device type identifier, the allocated device serial number, and the user identifier.

8. The server according to claim 7, wherein the obtaining comprises:
receiving an order creation request from a first terminal that is different from the terminal;
generating the order identifier based on the order creation request and transmitting the order identifier to the first terminal; and
receiving the device type identifier, the network access data, and the user identifier that correspond to the order identifier from the terminal.

9. The server according to claim 7, wherein the obtaining comprises:
sending the order identifier, the network access data, and the device type identifier to a device customization server; and
receiving the allocated device serial number that corresponds to the order identifier from device customization server.

10. The server according to claim 7, wherein the computer program code further includes code to implement:
receiving an order cancellation request from the terminal; and
sending the order cancellation request to a device customization server for clearing the device type identifier, the device serial number, and the network access data that are written into the controlled device and that are specified in the order cancellation request.

11. The server according to claim 7, wherein the performing the device registration comprises:
generating a device account according to the device type identifier, the device serial number, and the user identifier;
sending the device account to the controlled device; and
sending the device account to the terminal.

12. The server according to claim 7, wherein the computer program code further includes code to implement:
obtaining a tracking number associated with the order identifier;
obtaining logistics information corresponding to the tracking number; and
sending the logistics information to the terminal according to the user identifier corresponding to the order identifier.

* * * * *